UNITED STATES PATENT OFFICE.

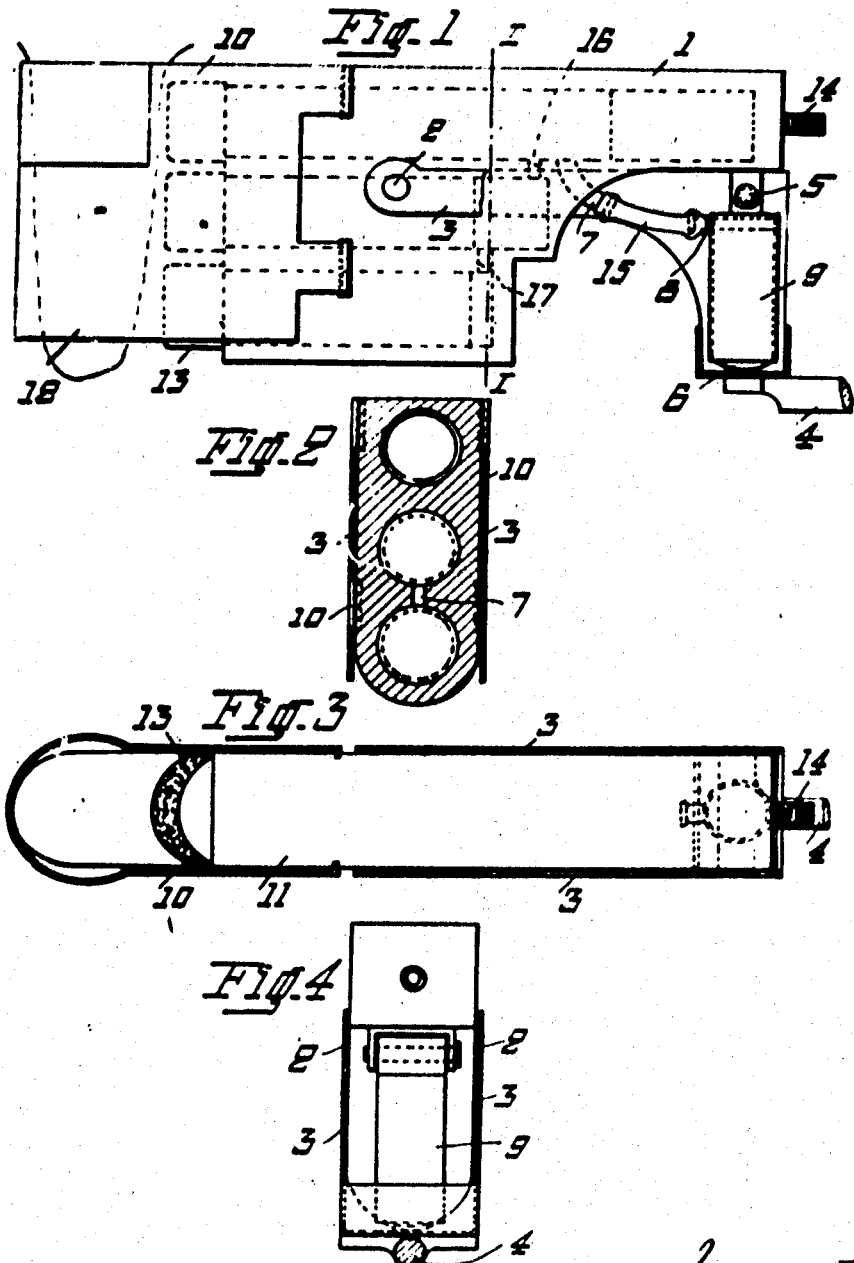

KNUT IVAR LINDSTRÖM, OF NYKVARN, SWEDEN.

MILKING-MACHINE.

934,681.   Specification of Letters Patent.   Patented Sept. 21, 1909.

Application filed December 8, 1908. Serial No. 466,454.

*To all whom it may concern:*

Be it known that I, KNUT IVAR LINDSTRÖM, a subject of the King of Sweden, and residing at Nykvarn, Sweden, proprietor, have invented certain new and useful Improvements in Milking-Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My present invention relates to milking machines of the kind in which air or water is used as the operating medium for effecting a lateral pressure on the teats to perform the milking and it more especially relates to milking machines of the art, where the milking organs are provided with a series of pistons, moving successively in cylinders.

My invention consists briefly therein that the milking organ, acting upon the teat, is suspended in such a manner from a movable bracket as to move in a vertical direction, expandible means being provided between the supporting bracket and the rear part of the milking device remote from the teat, for raising this rear part, by means of which the forward part of the device exerts a downward pull on the teat and udder. The said expanding device may consist, for instance, of a ball of india rubber or any other suitable air-tight material, which expands by the action of compressed air, or, as shown in the annexed drawing, of a piston, moving in a cylinder. The pressure medium, after having acted upon the milking device in such a manner that the upper part of the teat is compressed so as to close the communication between the teat and udder, is led in a suitable manner to the raising device, which acts upon the milking device in such a manner that the teat and the corresponding part of the udder are pulled downward. When the pressure medium ceases to act, the milking device is returned into its original position by the action of gravity or by means of a spring.

The advantages of this device are as follows:—1. The udder receives a light shock during the milking, whereby the emission of milk as well as complete milking is assisted, so that the time of milking is reduced. 2. The milking device adjusts itself automatically to the teat, if the latter should change position during the milking.

In the accompanying drawing:—Figure 1 shows the device in elevation, partially in section; Fig. 2 is a section of the device along the line I—I in Fig. 1. Fig. 3, a plan view of the same; and Fig. 4, an end-view thereof.

All the figures show the apparatus, applied to a milking device, which consists of pistons moving in cylinders and acted upon by means of a pressure medium.

The milking device consists of pistons 10, moving in cylinders 11, inclosed in a guard 1, provided at the forward portion with a shell 12, adapted to receive the teat. The pistons are provided with pressure parts 13, acting against the teats. The guard 1 with the pistons and cylinders is supported by means of two pivots 2 and a bow 3, firmly connected to a bracket 4, so that an oscillating movement on the pivot 2 may be imparted to the milking device and the guard. A cylinder 9 is suspended from the guard 1 by means of the pivot 5 and is provided with a piston 6 abutting against the bow 3. The upper one of the pistons 10 having been pushed forward, air is conducted by a pipe 7 which will then communicate with the uppermost cylinder, from the milking device through a pipe 15 to the cylinder pipe 8, whereby the cylinder 9 is caused to move upward on the piston 6, so that the rear part of the milking device is raised and the forward part of the same lowered because the bracket 4 cannot move in a vertical plane.

The cylinders communicate with each other by means of channels 16 and 17 bored in the cylinder walls. When the pistons are at their extreme inward position, the said channels are closed by the pistons, but when the pistons are at their extreme outward positions, the channels are open. By this arrangement, the pressure medium will be caused to fill the three cylinders so as to act successively on the pistons therein.

When the air is withdrawn from the milking device through the pipe 14, it is also withdrawn from the cylinder 9 and the rear part of the guard 1 consequently will be lowered to its original position by means of its weight.

What I claim is:

1. In a milking machine, the combination of a stationary bracket, a milking organ suspended therein and adapted to oscillate in a vertical plane, and means located between the said bracket and organ and adapted to oscillate said organ.

2. In a milking machine, the combination of a stationary bracket, a milking organ suspended therein and adapted to oscillate in a vertical plane, and expansible means located between the said bracket and the end of the said organ and adapted to oscillate the latter.

3. In a milking machine, the combination of a stationary bracket, pivots secured thereto, a milking organ adapted to oscillate about said pivots in a vertical plane, and an expansible body located between the said bracket and the said organ and adapted to oscillate the latter.

4. In a milking machine, the combination of a stationary bracket, pivots secured thereto, and a milking organ suspended by said pivots and adapted to oscillate in a vertical plane and an expansible body, comprising a piston located between the said bracket and said organ and adapted to oscillate the latter.

5. In a milking machine a stationary bracket, pivots fastened therein, a milking organ adapted to oscillate about said pivots in a vertical plane, a cylinder having its end secured to the end of said organ and a piston arranged in said cylinder and abutting against the bracket, said piston being adapted to oscillate said organ.

6. In a milking machine, the combination of a stationary bracket having pivots secured thereto, a milking organ adapted to oscillate about said pivots in a vertical plane, a cylinder having its ends secured to the end of said organ, a piston arranged in said cylinder and abutting against the bracket and a fluid supply pipe communicating with said cylinder and adapted to move the piston therein to oscillate the said organ.

7. In a milking machine a stationary bracket having pivots, a milking organ adapted to oscillate about said pivots in a vertical plane, a plurality of cylinders (11) communicating with each other, a piston arranged in each of said cylinders and a cylinder (9) having its end secured to the end of said organ, said cylinder (9) communicating with one of the said first-mentioned cylinders (11) and a piston in said cylinder (9) abutting against the said bracket and adapted to oscillate the said organ.

8. In a milking machine the combination of a stationary bracket having pivots secured thereto, a guard provided with a space for the teat, and adapted to oscillate about said pivots in a vertical plane, and a plurality of intercommunicating cylinders inclosed in said guard, pistons arranged in said cylinders adapted to be successively brought in contact with the teat, a cylinder secured to the end of said guard, a piston arranged in said latter cylinder and abutting against the said bracket, the said latter cylinder communicating with one of the intercommunicating cylinders.

In testimony, that I claim the foregoing as my invention, I have signed my name in presence of two subscribing witnesses.

KNUT IVAR LINDSTRÖM.

Witnesses:
HARRY ALBIHN,
HJALMAR ZETTERSTRÖM.